Jan. 31, 1950   J. MILAZZO   2,495,750
CURRENT COLLECTING CONSTRUCTION
Filed Aug. 20, 1945

INVENTOR.
JOSEPH MILAZZO.
BY
Ralph L Chappell
ATTORNEY.

Patented Jan. 31, 1950

2,495,750

UNITED STATES PATENT OFFICE 2,495,750

CURRENT COLLECTING CONSTRUCTION

Joseph Milazzo, New York, N. Y.

Application August 20, 1945, Serial No. 611,673

6 Claims. (Cl. 191—53)

(Granted under the act of March 3, 1883, as amended April 30, 1928; 370 O. G. 757)

The present invention relates to a current collecting construction and has special reference to a current collecting construction for use on wall cranes and the like.

When the ordinary trolley shoes or wheels are used on wall cranes, such as for collecting current from the bridge span conductors, arcing and poor contacts frequently result due to vibration. This affects the operation of the cranes and causes injury to the conductors and fittings. With the present invention arcing is eliminated and a good contact is maintained at all times.

An object of this invention is to provide a current collecting construction which may be used on wall cranes and the like and will continuously maintain contact with a current collector.

Another object is to provide a device as referred to above which is of simple construction and may be easily and quickly positioned with respect to a current conductor.

Further objects and advantages of this invention, as well as its construction, arrangement and operation, will be apparent from the following description and claims in connection with the accompanying drawings, in which, Fig. 1 is a side elevational view of a current collecting construction embodying the present invention.

Figure 1:
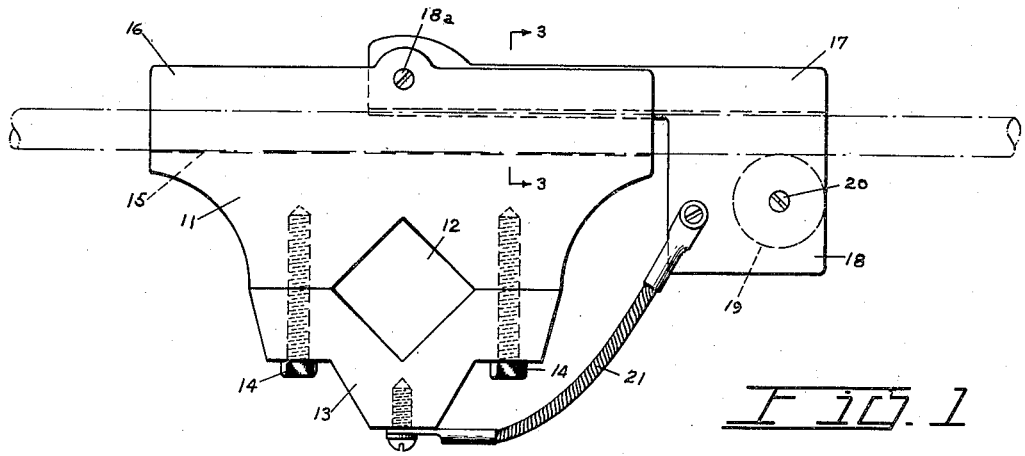
Figure 2:
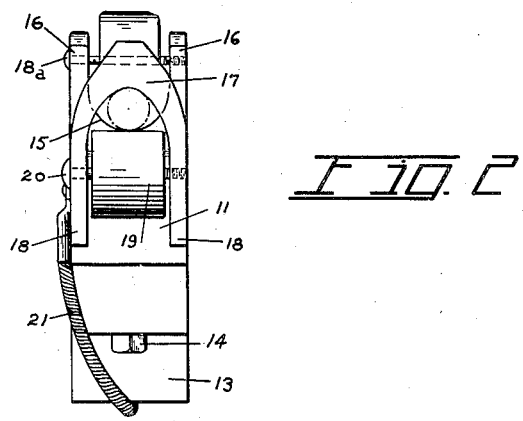
Fig. 2 is an end elevational view of the device.
Figure 3:
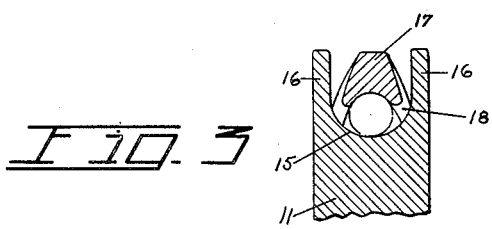
Fig. 3 is a cross sectional view taken on the line 3—3 of Fig. 1.

In the drawings there is shown a current collecting shoe 11 having an opening 12 therein for receiving a bracket carried by the movable carriage of a wall crane or other device. The lower portion 13 of the shoe may be removed for placing the shoe on the bracket. It is secured to the remainder of the shoe by securing means such as screws 14. The upper portion of the shoe 11 is formed with a groove 15 for engaging the lower surface of a current conductor with the sides 16 of the groove extending upwardly above the conductor.

Rotatably connected to the sides 16 intermediate the ends thereof is a retaining member 17. A removable pin or screw 18a or other suitable means may be employed for pivotally connecting the retaining member 17 to the sides 16. The retaining member 17 is preferably formed with a shallow longitudinally extending groove in the lower side thereof for fitting about the upper surface of the current conductor. The outer end of the retaining member 17 extends beyond the end of the shoe 11 and is bifurcated with the sides 18 thereof extending downwardly a distance below the current conductor. A wheel 19 is mounted between the sides 18 of the retaining member by means of a removable pin or screw 20. The wheel 19 is so positioned that the upper portion thereof will engage the lower side of the current conductor while the main portion of the retaining member engages the upper side of the conductor.

The shoe 11, retaining member 17, and the wheel 19 are all preferably formed of a current conducting material such as iron, copper or brass. A pigtail, or wire, 21 extends from the retaining member 17 for connection to the motor lead for operating the carriage or crane.

To position the current collecting construction the pins 18a and 20 are removed and the shoe 11 is mounted to engage the lower surface of the current conductor. Thereafter the pin 18 is replaced to mount the retaining member on the shoe and when the wheel is positioned to engage the lower surface of the conductor the pin 20 is re-inserted.

With this construction the weight of the retaining member 17 causes it to rest against the upper surface of the current conductor while the shoe 11 and wheel 19 engage the lower surface thereof. This insures continuous contact between the current collecting construction and the trolley wire.

While the present invention has been described as including a current collecting shoe, a retaining member and wheel could be used in connection with a trolley wheel to accomplish the same result.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A current collector comprising a first shoe for contacting the lower side of a current conductor, a second shoe pivotally connected to said first shoe and arranged with a first contacting part thereof in partly overlapping relation with said first shoe whereby to engage the upper side of said current conductor, said second shoe extending beyond one end of said first shoe and having a second contacting part for engaging the lower side of said conductor.

2. A current collector comprising a current-collecting shoe having a longitudinally extending groove in the upper portion thereof for contacting the lower side of a current conductor, a conductor retaining member having a longitudinally extending groove in the lower portion thereof, said retaining member being removably and pivotally connected adjacent one end of the upper portion of said shoe for contacting the upper side of said current conductor, said retaining member having a contacting part in superposed relation with respect to said shoe and extending beyond one end thereof, side members carried by said retaining member and projecting below said conductor, and a roller detachably mounted between said side members and positioned vertically below said retaining member to engage the lower side of said current conductor.

3. An electrical contact device comprising a first channel member adapted slidably to receive a current-carrying conductor in the channel portion thereof, a second channel member rotatably connected to said first member and having a part adapted normally to be received within the channel of said first member in superposed relation with respect to the conductor and said first member, an extension on said second channel member depending below said conductor, and means supported on said extension for contacting said conductor.

4. The device as defined in claim 3 wherein said last-named means comprises a conductive roller.

5. The device as in claim 3, further comprising means conductively connecting said extension and said first channel member.

6. A current collector comprising a first shoe for contacting the lower side of a current conductor, a second shoe having first and second contacting parts, means pivotally connecting said second shoe to said first shoe with said first contacting part in partly overlapping relation with said first shoe, whereby slidably to engage the upper side of said current conductor, said second contacting part being disposed on a portion of said second shoe extending beyond one end of said first shoe and adapted to engage the lower side of said conductor.

JOSEPH MILAZZO.

REFERENCES CITED

The following references are of record in the file of this patent:

UNITED STATES PATENTS

| Number | Name | Date |
| --- | --- | --- |
| 566,984 | Hunter | Sept. 1, 1896 |
| 623,678 | Lebcher | Apr. 25, 1899 |
| 1,008,913 | Hoofring | Nov. 14, 1911 |
| 1,079,059 | Miller | Nov. 18, 1913 |
| 1,286,103 | Reed | Nov. 26, 1918 |
| 1,821,424 | Coseo | Sept. 1, 1931 |